PLOTTING SYSTEM

Filed July 19, 1947

INVENTORS: D. C. BOMBERGER
H. G. OCH
BY
D. MacKenzie
AGENT

INVENTORS: D. C. BOMBERGER
H. G. OCH
BY D. MacKenzie
AGENT

Aug. 10, 1954 D. C. BOMBERGER ET AL 2,686,099

PLOTTING SYSTEM

Filed July 19, 1947

7 Sheets-Sheet 3

INVENTORS D. C. BOMBERGER
H. G. OCH

BY D. MacKenzie

AGENT

INVENTORS D. C. BOMBERGER
H. G. OCH
BY
D. MacKenzie
AGENT

INVENTORS: D. C. BOMBERGER
H. G. OCH
BY D. MacKenzie
AGENT

D. C. BOMBERGER
H. G. OGH
INVENTORS:
BY D. MacKenzie
AGENT

INVENTORS: D. C. BOMBERGER
H. G. OCH
BY
D. MacKenzie
AGENT

Patented Aug. 10, 1954

2,686,099

UNITED STATES PATENT OFFICE 2,686,099

PLOTTING SYSTEM

David C. Bomberger, Plainfield, and Henry G. Och, Short Hills, N. J., assignors to Bell Telephone Laboratories, Incorporated, New York, N. Y., a corporation of New York Application July 19, 1947, Serial No. 762,164

15 Claims. (Cl. 346—8)

This invention relates to an improved system of apparatus by the use of which a graphical record is made of the path of a body observed in motion on or above the surface of the earth. The invention is useful in finding the course and map location of a surface vessel; the course, height and horizontal coordinates of an aircraft; and the point of rising from the ground or that of returning thereto if the object observed is one launched upward from the earth's surface.

The system of the invention includes a rectangular plotting board on which may be oriented a map overlaid with a tracing paper. The associated apparatus makes use of electrical voltages representing observations made by radar or optical means of the body's range, bearing and height relative to an observing position, to draw on the tracing paper simultaneously the projections of the body's path on the horizontal plane and on the vertical plane including that path.

The general object of the invention is therefore to provide improved means for graphically displaying the horizontal and the vertical motion of an observed body.

A "ground line" is drawn on the tracing paper, parallel to one side of the board, and this line represents the level through the observing position. The vertical projection of the body's path is referred to that level and from contour lines on the map there is continuously obtainable the elevation of the body relative to any surface point in the line of the body's motion. Thus, if the flight of an aircraft is being observed, timely warning may be given of danger ahead. For a surface vessel, the horizontal projection suffices to permit warning of underwater or surface hazards; for aircraft also, the horizontal projection of the flight affords continuous indication of the craft's course relative to a desired course and to surface features.

Accordingly, an object of the invention is to facilitate the guidance of air or surface navigation.

If the body observed is a shell fired from an enemy mortar, the portion of the trajectory observed and displayed as the vertical projection may be extrapolated backward and, by the use of plotting aids later to be described, the point of firing may be determined on the map and counter-fire may be directed. If the mortar is firing toward the enemy, the trajectory may be extrapolated forward and the point of fall located, making possible suitable correction of the fire.

Another object of the invention is thus seen to be to provide a system of apparatus and method of use thereof to obtain information essential to the control of or defense against mortar fire.

A feature of the invention is the provision of means enabling the operator to choose the midpoint of one side of the board to represent the observing position and so arrange the apparatus that the direction at right angles to that side shall be toward north, east, south or west according to the general direction from the point of observation to the point to be located. The map is correspondingly oriented beneath the tracing paper, with the map position of the observer directly under the chosen point; in this way the fullest use of the map may be made and the range of the board is twice what it would be if the center of the rectangle were chosen to represent the observer's post.

Another feature of the invention is the provision of means for drawing the vertical projection of the path of the body on the plotting surface as a development of the surface (possibly curved) which is being generated continuously by the vertical line through the body and projected to the ground.

Other features and possible applications of the invention will beocme evident from the following description thereof, referring to the accompanying drawings, in which.

In all figures, like elements have like numerals or letters.

Figures 1, 3:
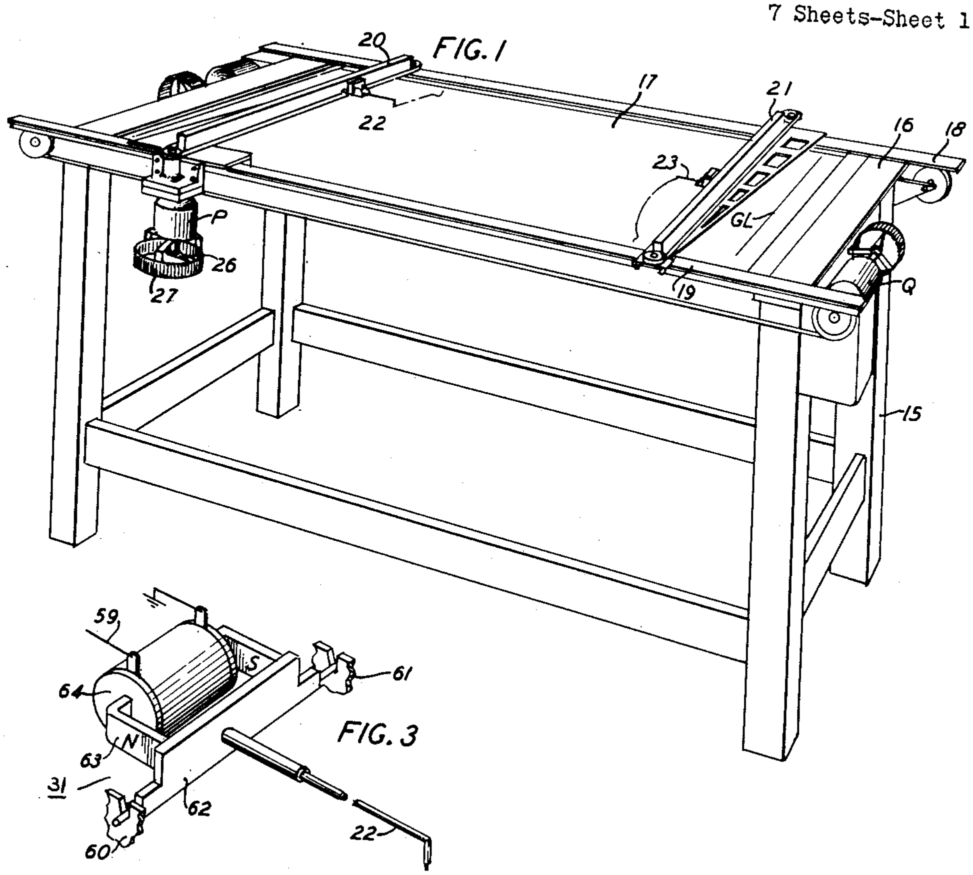
Fig. 1 is a schematic showing of the plotting board used in the invention.
Fig. 3 shows schematically the means whereby the plotting pens shown in Figs. 1 and 2 are held up from the plotting surfaces or allowed to drop thereto.

Referring first to Fig. 1, table 15 supports a plotting surface 16 understood to be of transparent material, on which is fastened a map (not shown) overlaid by a sheet 17 of tracing paper. On rails 18 and 19 travel, left or right, arms 20 and 21 each under the control of a servomotor. On each arm a plotting pen, 22 on arm 20, 23 on arm 21, is carried which travels along the arm from front to back each under control of a servomotor. In Fig. 1 are indicated only motor P controlling pen 22 along arm 20 and motor Q controlling arm 20 to move left or right over paper 17. It is to be understood that the showing of Fig. 1 is schematic only, omitting indications of the lights which illuminate from below the work surface and of the usual facilities for affixing or renewing the tracing paper. The complete board which has been adapted for use in the present invention is disclosed and claimed in the application Serial No. 679,352, Plotting Board, filed June 26, 1946, by H. G. Och and D. B. Parkinson and assigned to the same assignee as the present invention. GL indicates a line drawn by pen 23 representing a horizontal line through the observing position.

Figure 2:
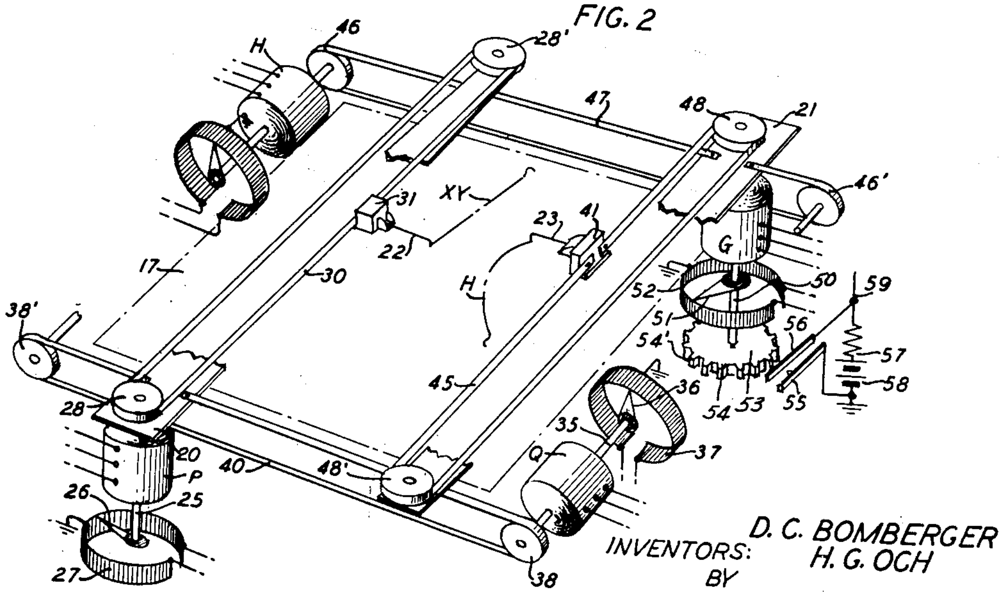
Fig. 2 is a schematic showing of the means for controlling the plotting means on the board of Fig. 1.

In Fig. 2, motor P controls shaft 25 carrying brush 26 on potentiometer 27 and pulley 28 around which passes endless tape 30, which also passes around pulley 28′ on the other side of the board from pulley 28. Motor P, with shaft 25, brush 26, potentiometer 27 and pulleys 28, 28′, is carried on arm 20, traveling therewith left or right across the tracing surface 17. Pen 22, supported by pen carriage 31 suitably fastened to tape 30 is caused by rotation of shaft 25 to move across the board from front to back independently of the left and right motion of arm 20. Motor Q controls shaft 35 carrying brush 36 on potentiometer 37 and pulley 38. Tape 40 passes around pulleys 38 and 38′ and is fastened by any convenient means to arm 20. The rotation of shaft 35 effects the left and right motion of arm 20. The combined action of motors P and Q carries pen 22 to trace a line, which, as will be later explained, depicts the horizontal projection of the path of an observed object, for example, a mortar shell.

In like manner, pen 23 supported by pen carriage 41 is driven by motor G through tape 45 passing around pulleys 48, 48′ carried on arm 21, to move front and back across the tracing surface at right angles to the left and right motion of arm 21, itself drawn from motor H through pulleys 46, 46′ and tape 47 by an arrangement like that controlled by motor Q. Motor G controls shaft 50 carrying, in addition to pulley 48, brush 51 on potentiometer 52 and interrupter 53. The last-named element is a disc provided with angularly equidistant bosses 54. As shaft 50 turns, bosses 54 successively close for a short interval contacts 55 and 56, the former grounded and the latter connected through resistor 57 to one terminal of battery 58, of which the other terminal is grounded. Contact 56 is also directly connected by conductor 59 to one terminal of the electromagnet controlling pen 22, described in connection with Fig. 3. In order to identify unambiguously the trace breaks later described, an extra boss 54′ is provided.

As indicated in Fig. 3, pen 22 is carried with pen carriage 31 which comprises supports 60, 61, slotted to receive pivots formed on the ends of plate 62 to which pen 22 is directly fastened. Plate 62 is of magnetic material and is normally held against the poles of permanent magnet 63; the pen is thus held off surface 17. Except when disc 53 is in such a position that connection is established between contacts 55 and 56, current from battery 58 flows through resistor 57 and the winding of electromagnet 64. This winding encloses magnet 63 and it is arranged that the flow of current in electromagnet 64 shall neutralize the field of magnet 63, whereupon pen 22 drops to surface 17. The angular position of shaft 50 with reference to an arbitrary starting position corresponds, as later explained, to the time integral of the horizontal velocity of the observed body, and so to the point on the plot traced by pen 22 directly below the body. The control of pen 23 is identically like that of pen 22, and current from battery 58 flows through an electromagnet winding on carriage 41 in parallel with the current through electromagnet 64. The two pens are thus simultaneously dropped to surface 17, being lifted therefrom when disc 53 reaches a position where contacts 55 and 56 are enabled to short the two windings and allow the corresponding permanent magnets to lift the pens. The two traces are then simultaneously broken, the beginnings of the breaks occurring at the same instant of time.

In the description which follows, pen 22 and the trace it makes will be referred to as the XY pen and the XY trace; pen 23 and its trace, as the H pen and the H trace. The traces are so designated in Fig. 2.

There will be assumed the provision of radar or optical observing means such as are now well known and require no description here, inasmuch as they are no part of the present invention. Such observing means obtain the position of the observed body in polar coordinates of slant range, elevation and azimuth and are assumed provided with computing means such, for example, as are disclosed by C. A. Lovell et al. in United States Patent 2,408,081, Artillery Predictor, September 24, 1946. The computing means is capable of transforming the polar data into rectangular coordinates X (east of observer), Y (north of observer) and H (height above observer's level); all the data are expressed as voltages. It is convenient to intervene in this computation for the purpose of adjusting the scale factor of the voltages to agree with the scale of the map used. This is done in the circuit of Fig. 4, now to be referred to.

Figure 4:
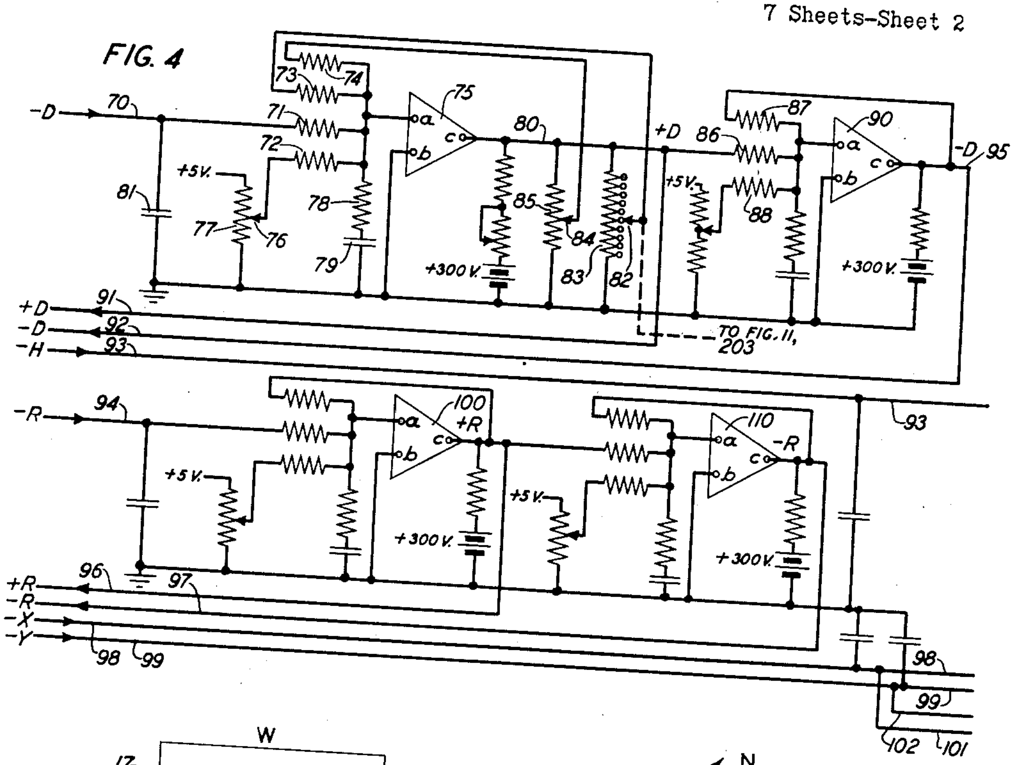
Fig. 4 is a diagram of the electrical circuits whereby the voltages representing observed data are made available suitably for the actuation of the control means of Fig. 2.

The representative voltages are received from the observing means as negative voltages, so that the slant range D appears as a voltage −D on conductor 70 in the circuit of Fig. 4. A summing amplifier 75 reverses the polarity of the voltage on conductor 70. Amplifier 75 is an amplifier such as is disclosed by K. D. Swartzel, Jr., in United States Patent 2,401,779, June 11, 1946; it contains three stages, so the output voltage at the anode of the last stage is of opposite polarity to the input voltage on the control grid of the first stage, including amplification as desired. In Fig. 4, and in other figures where summing amplifiers appear, the letters *a*, *b* and *c* always refer respectively to the control grid of the first stage, to the common ground of the three stages and to the anode of the third stage.

The input circuit of amplifier 75 is identical with the input circuit of many of the other amplifiers in the system, and one description will serve for all, differences being indicated wherever found. Anode power supply is indicated in the showing of each amplifier, while cathode heating power is understood but not shown.

Resistances of 10,000 ohms each exist in the observing means portions of conductors 70, 93, 94, 98, 99, and must be considered in amplifier gain calculations.

Conductor 70 feeds the negative slant range voltage −D via resistor 71 (0.24 megohm) to point *a*. This point receives also a "zero set" voltage via resistor 72 (0.57 megohm) and feedback voltages via resistors 73 and 74 (0.373 and 2.8 megohms, respectively). The zero set voltage is adjustably derived by tap 76 on potentiometer 77 which is connected to a source of 5 volts positive, tap 76 is so placed that with zero voltage on conductor 70 there shall be no output voltage between conductor 80, connected to point *c*, and ground. Resistor 78 in series with condenser 79 (resistance 12,000 ohms and capacity 0.01 microfarad) are connected between ground and point *a* to stabilize the operation of amplifier 75, while 1-microfarad condenser 81 between conductor 70 and ground is used as a cushioning capacity against sudden changes in the slant range voltage.

Figure 11:
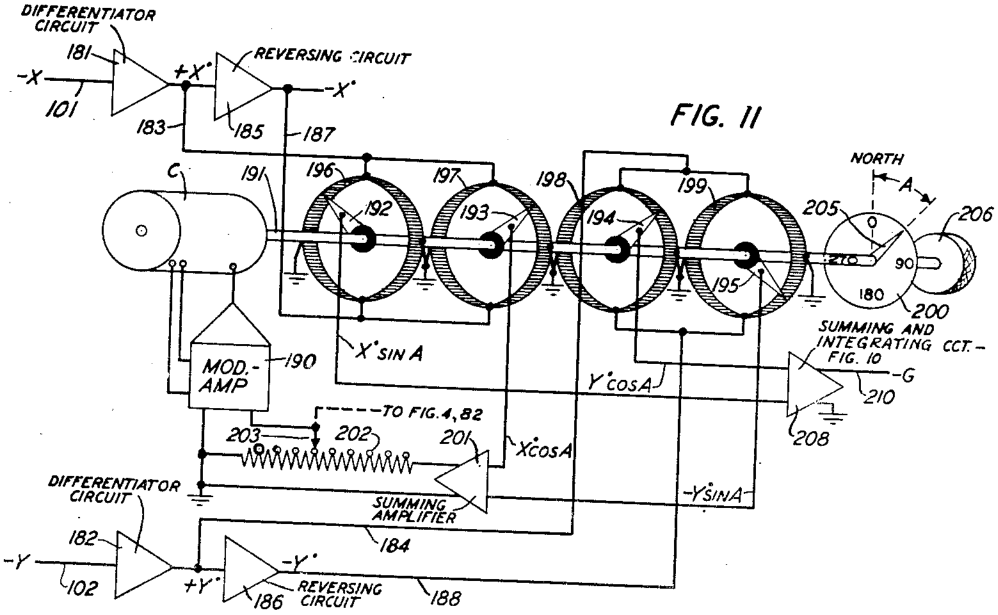
Fig. 11 is a diagram of the apparatus used to determine the course of the observed body and to obtain the time integral of the horizontal velocity of the body.

Feedback resistors 73 and 74 are connected to adjustable taps 82, 84 on potentiometers 83, 85, respectively. Potentiometer 83 is of 45,000 ohms resistance, while the resistance of potentiometer 85 is 20,000 ohms. The adjustment of tap 82, which is ganged to a tap on a potentiometer shown in Fig. 11, provides a coarse control of the gain of amplifier 75; moving tap 82 downward on potentiometer 83 increases the gain of the amplifier as compared with its gain when tap 82 stands furthest from ground in the ratio of the total resistance of potentiometer 83 to the resistance included betwen tap 82 and ground, with slight modification due to the resistance 73 which acts as a load on 83. The adjustment of tap 84 provides a fine gain control.

The gain control just described serves the purpose of adjusting the scale factor of the voltage representative of X, Y and H to fit the scale of the map used under tracing surface 17. If the slant range voltage D is on the scale N volts per yard, while the motion of the XY pen along either coordinate requires $N_1$ volts per yard on the map scale in use, then the gain of amplifier 75 must be set to provide on conductor 80 a voltage $$\frac{N_1}{N}$$

times that on conductor 70. No detailed description of the procedure is needed. It will suffice to say that the radar operator is directed to set the radar in a direction, say north, with elevation zero and at a range setting of M yards. Pen 21 is then operated and the gain of amplifier 75 adjusted to cause the pen to move north over M yards on the map. In an actual embodiment of the invention, the amplifier gain was adjustable to use with map scales from 5,000 to 1 to 51,000 to 1. The adjustment of scale factor is disclosed and claimed in application Serial No. 679,352, Plotting Board, H. G. Och and D. B. Parkinson, filed June 26, 1946, and assigned to the same assignee as the present invention.

The voltage on conductor 80 then represents to the proper scale the slant range of the observed body; this voltage is positive, being reversed in polarity from the negative voltage on conductor 70, and may be numerically related to that voltage in any desired ratio. For the sake of simplicity, it will be assumed herein that this ratio corresponds to the showing of Fig. 4 where tap 82 stands above ground 4/9 of the total voltage of conductor 80, ignoring the fine gain adjustment by tap 84, it being assumed at the ground point. Numerically, the voltage ratio here is $$\frac{9}{4}\times\frac{0.373}{0.25}=3.36:0.373 \text{ megohm}$$

is the resistance of resistor 73, while that of resistor 71 and the protective resistance (not shown) in series with conductor 70 is 0.25 megohm.

The electrical computers known to the art, such as the computer disclosed by Lovell et al., require both positive and negative voltages for decomposing the slant range voltage into voltages for horizontal range R and height H, and then for resolving R into east-west and north-south components X and Y. The positive voltage on conductor 80 is reversed in sign without change in value by amplifier 90, a summing amplifier like amplifier 75, but with conductor 80 connected to point *a* through 0.1 megohm resistor 86, equal in resistance to feedback resistor 87, while zero set resistor 88 is 0.2 megohm. The negative slant range voltage so obtained is available on conductor 95 connected to point *c*.

Voltages +D and −D, from conductors 80 and 95, are returned to the electrical computer in the observing means. This computer then returns negative voltage −H and −R, representing respectively the height and the horizontal range of the body under observation. Conductors sending voltages to the observing means are identified by left pointing arrows, as on lines 91, 92, +D and −D; those returning voltages from the observing means by right pointing arrows, as on lines 93, 94, −H and −R.

The scale of the D voltage being now correct, it follows that the H and R voltages are likewise so. The −H voltage needs no decomposition, but the −R voltage must be returned to the observing means to be resolved into X and Y components. This is accomplished by summing amplifiers 100 and 110, provided each with a zero set adjustment and serving only to reverse and rereverse in polarity the voltage on conductor 94, without change of scale. So treated, voltages +R and −R are returned to the observing means via conductors 96, 97 and from the computer in the observing means conductors 98, 99 provide voltages −X, −Y, respectively. Conductors 98, 99 supply the controlling voltages for the motors P and Q of Fig. 2; branches 101, 102 supply respectively X and Y voltages to the differentiating circuits of Fig. 9. Conductor 93 supplies control voltage for motor H, Fig. 2.

Motion of the observed body toward the east will be referred to as X and will be represented by a negative voltage from the observing means. Motion toward the north, Y, will also be received from the observing means as a negative voltage. So, the voltages on conductors 98, 99 will be negative for eastward and for northward motions, respectively, positive for westward and for southward motions. Motors P, Q, H and G will be by preliminary adjustment set to cause pens 22 and 23 each to stand initially at the center of the board. Then by biasing voltages, the XY pen will be moved by motor Q to take a position near the mid-point of the left edge of the board and the H pen will be moved by motor H to a point near the center of the right edge as seen by an operator assumed to face the board from the lower edge of Fig. 2.

The H trace is always drawn at the right of the board and from the operator's position, regardless of the orientation of the map. But for best use of the board in plotting the XY trace, it is desirable that the map be so placed that the observing position lies just beneath the point where the XY pen will touch the tracing surface in the absence of any XY voltage, namely, at the center of the left side. The field of search on the map may lie in any direction from the observer, and the map may be so swung about the observer's position that north on the map shall lie toward the left, right, front or back edge of the board as is most convenient. The orientation of the XY pen operation will be called north, east, south or west according as the direction from left to right on the board is made to correspond to north, east, south or west. Obviously, if the positive X and Y pen motions are to correspond always to east and north motions of the observed body, and the P motor always moves that pen left and right, it is necessary to provide for interchanging the X and Y controlling voltages on the P and Q motors, for reversing their directions of shaft rotation and for reversing the bias of the Q motor.

The utility of such provision will be clear from an examination of Figs. 5A–5D. In these figures a target $T_1$ traveling northeast and first observed north and east of the observer, can be followed with orientation north, Fig. 5A, and be observed as it leaves the map field with orientation east, Fig. 5B. Target $T_2$, traveling southwest and first observed south and east, can be well followed with orientation south, Fig. 5C. Neither target can be successfully followed with orientation west, Fig. 5D.

In Figs. 5A to 5D, the tracing paper is represented by rectangle 17, and $R_a$ is the center of the left edge of the board. Arrows drawn between motors P and Q and the corresponding sides of the rectangle indicate the direction in which the −X and −Y voltages of Fig. 4 will move the XY pen in the several orientations. The bias voltage which places the arm driven by motor Q at the left side of the board is +75 volts north and east, −75 volts south and west. Motors P and Q are driven from −X and −Y, respectively on north and south, by −Y and −X on east and west.

Figure 5A:
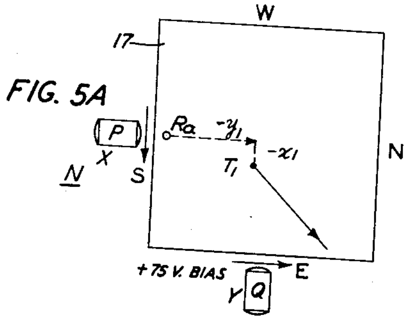
Figs. 5A, 5B, 5C and 5D show respectively the motions imparted to the P and Q control means of Fig. 2 when the direction left to right on the board of Fig. 1 is north, east, south and west.
Figure 5B:
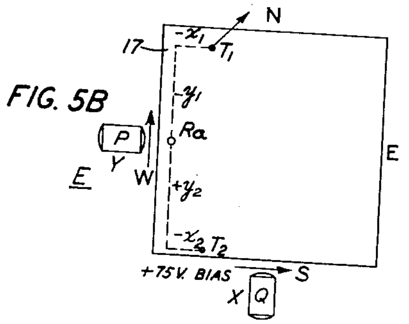
Figure 5C:
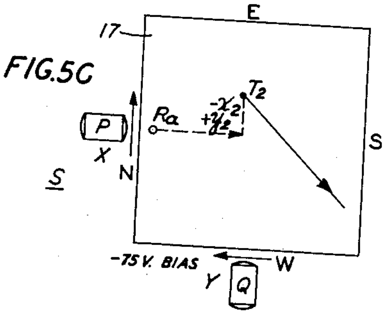
Figure 5D:
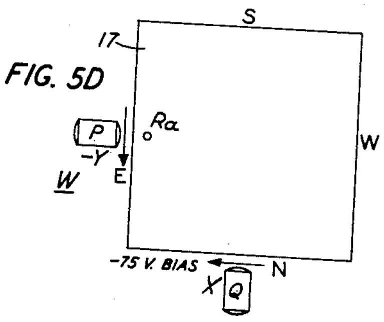

Consider, for example, Figs. 5A and 5C. In Fig. 5A target $T_1$ is first observed above a point north and a little east of $R_a$. The X and Y components of this point relative to $R_a$ are both positive, being both represented by negative voltages on conductors 98 and 99 of Fig. 4. The negative X voltage drives motor P to move the XY pen toward the east (downward in Fig. 5A) while the negative Y voltage overcomes in part the positive bias of the circuit controlling motor Q and drives the XY pen from $R_a$ toward the north. In Fig. 5C, target $T_2$ is first observed south and a little east of $R_a$. The negative X voltage corresponding to a positive east component must drive the XY pen toward the east (upward, here). The Y component is now negative, so the Y voltage is positive and overcomes a part of the negative bias which in this orientation puts arm 20 at the left side and pen 22 at $R_a$. The XY pen therefore moves to the right, south, and back, east. In Figs. 5A to 5C, the X and Y voltages locating targets $T_1$ and $T_2$ are represented in magnitude by small letters, $x_1$, $y_1$, $x_2$, $y_2$, and are given the signs corresponding to their actual polarities. The required switching involves a ten-deck switch with four positions on each deck to effect the necessary changes, as in the following table, which assumes $x_1$ and $y_1$ positive:

| | Right Side is— | | | |
|---|---|---|---|---|
| Orientation | N | E | S | W |
| P motion {coordinate positive} | down | up | up | down |
| Q " " | right | right | left | left |
| P voltage | X | Y | X | Y |
| Q " | Y | X | Y | X |
| Q bias | +75v | +75v | −75v | −75v |

Besides reversing motor shaft rotations and interchanging X and Y voltages and reversing the bias voltage, it is necessary to reverse the polarity of the voltage across the feedback potentiometers from which the servomotors derive voltages canceling the input, X or Y, voltages which set them in motion. If the orientation is north, for example, with X coordinate positive, a negative X voltage actuates the P motor to move pen 22 downward; the pen stops when a positive feedback voltage from a potentiometer brush cancels the X voltage on the input of a summing amplifier. The same is requisite when the orientation is west, and the polarity of the voltage across the potentiometer is the same in these two cases, the P motor shaft (now responding to Y) turning the same way in both. When the P shaft reverses, as on east or south, the potentiometer brush travels for positive coordinate in the direction opposite to its previous motion from ground and if it is here to derive a positive feedback voltage, the polarity across the potentiometer must be reversed. The reversals described are required independently of the signs of the X and Y components of target position relative to the observer. In the foregoing table, the assumption of positive $x_1$ and $y_1$ coordinates is needed only to define the order of the entries.

The Q motor, controlling the left and right positions of arm 20, is on "north" biased 75 volts positive (canceled by a negative feedback, servo-derived, voltage when arm 20 is at the left side of the tracing surface). A negative Y voltage moves the arm right, i. e., toward north by overcoming in part the biasing voltage. The bias remains in the same polarity on "east," reverses on "south" and stays reversed on "west."

Figure 6:
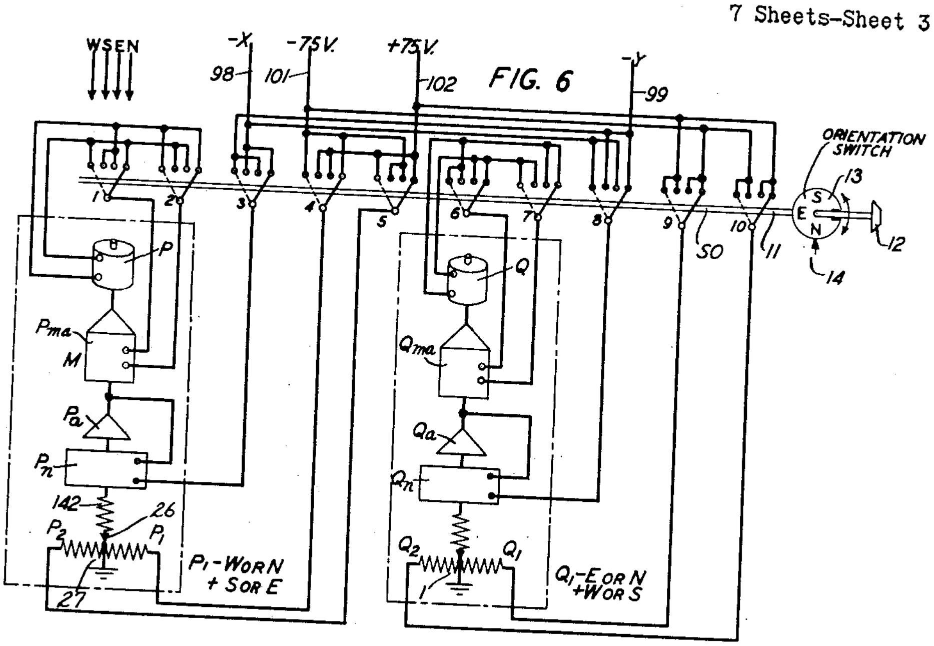
Fig. 6 shows diagrammatically the switching of connections to drive the horizontal projection plotting pen of Fig. 2 in accordance with the orientations of Figs. 5A to 5D, inclusive.

Fig. 6 shows symbolically an orientation switch carrying four-position switches 1 to 10 on shaft 11, turned by hand at knob 12. Shaft 11 may be provided with a plate 13 on which are read the letters N, E, S and W, corresponding to the orientation of the board. When, as shown, N is opposite pointer 14, the blades of all the switches 1 to 10 make the contacts respectively appropriate. In the position shown in Fig. 6 shaft 11 is on north and the contact arms of switches 1 to 10 are shown in full lines, whereby voltage —X from conductor 98 is applied by switch 3 to control motor P, —Y from conductor 99 by switch 8 to control motor Q. The connections of switches 1, 2 and 6, 7 are initially arranged to drive appropriately these two motors in the senses indicated in Fig. 5A. Switches 4, 5 and 9, 10 control the polarities of the voltages across the potentiometers over which the shafts of motors P and Q drive brushes to derive the feedback voltages respectively opposing —X and —Y. In dotted lines are indicated the switch arm positions on orientation west, knob 12 being turned counter-clockwise, as viewed from the right, through positions east and south to west.

In Fig. 6, it will be observed that the X and Y voltages control motors P and Q through their connection by switches 3, 8 to input networks *Pn*, *Qn*, followed by amplifiers *Pa*, *Qa* and modulator-amplifiers *Pma*, *Qma*. These elements are diagrammatically shown in Figs. 7 and 8.

Figures 7, 8:
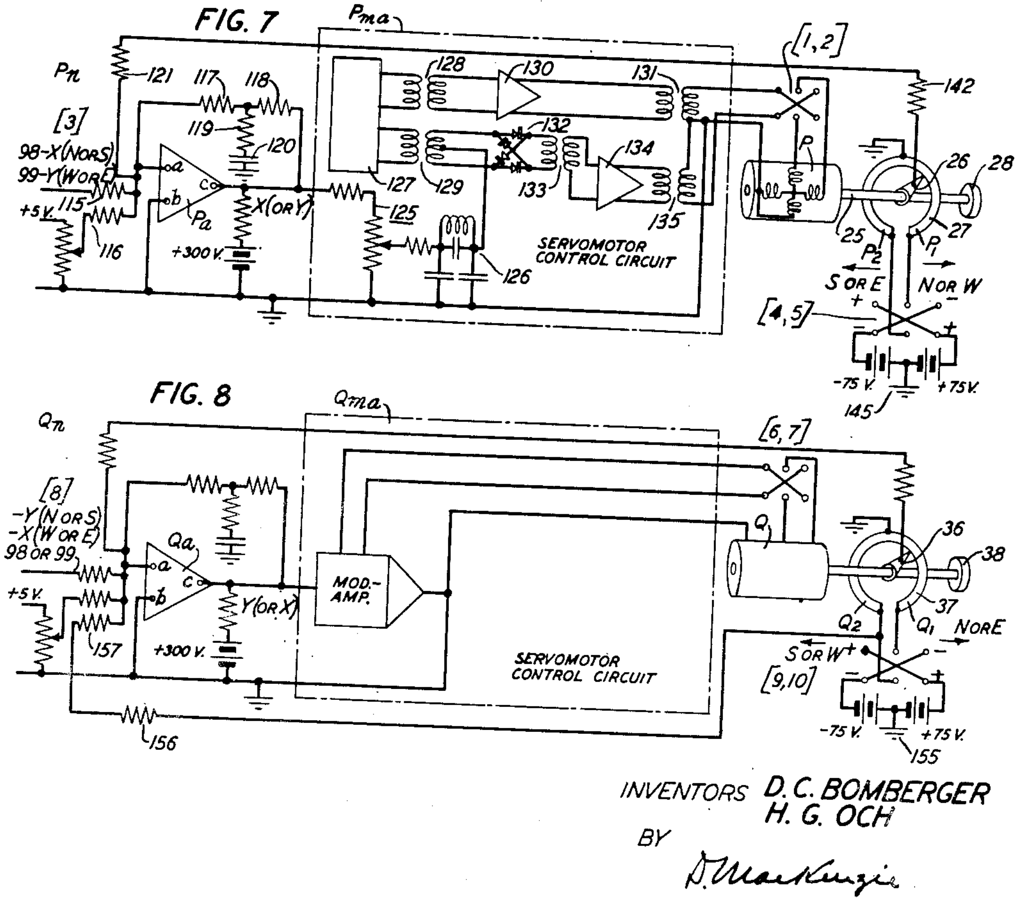
Fig. 7 shows diagrammatically the circuit controlling servomotor P of Fig. 2.
Fig. 8 shows diagrammatically the circuit controlling servomotor Q of Fig. 2.

Referring now to Fig. 7, input network *Pn* comprises resistor 115, 0.24 megohm, through which the X voltage (on "north" or "south") or the Y voltage (on "east" or "west") is supplied to point *a* of amplifier *Pa* of Fig. 6. Zero set is afforded as elsewhere described via resistor 116, 0.2 megohm, and feedback from *c* to *a* by resistors 117 and 118, each 0.75 megohm, their junction being coupled to ground through 15000 ohm resistor 119 in series with 0.4 microfarad condenser 120. Amplifier *Pa* is a Swartzel summing amplifier, with point *a* receiving also through 0.24 megohm resistor 121 the servo-derived voltage which opposes the voltage —X on conductor 98 or —Y on conductor 99.

Element *Pma* of Fig. 6 comprises the apparatus shown in the similarly designated dashed rectangle of Fig. 7. This includes voltage divider 125 from which a selected fraction of the output voltage of amplifier *Pa* is passed via filter 126 to a control circuit. This circuit comprises two-phase oscillator 127, such as disclosed in United States Patent 2,175,427, September 19, 1939 to H. H. Scott with phase shifting means as disclosed in United States Patent 1,717,400, June 18, 1929 to H. Nyquist. The voltages of the two phases in quadrature are transmitted from transformers 128, 129, one phase through amplifier 130 and transformer 131, to the one or the other of the field coils of two-phase motor P, the other phase through modulating circuit 132, transformer 133, amplifier 134 and transformer 135 to the other or the one of the field coils of motor P. The selection of field coils is made by the orientation switch at switches 1 and 2, Fig. 6. Modulating circuit 132 is similar to that disclosed by F. A. Cowan in United States Patent 2,025,158, December 24, 1935; it serves to control in magnitude the voltage in the secondary winding of transformer 135 and to cause this voltage to reverse in phase, according as the voltage from amplifier *Pa* varies in magnitude and changes polarity.

The circuit *Pma* thus enables motor P to drive shaft 25 and pulley 28 (Fig. 2) in a direction corresponding to the sign of the voltage from voltage divider 125, which voltage is reversed in sign from that on conductor 98 or 99. Linear potentiometer 27 formed in a circle concentric with shaft 25, is grounded at its mid-point and its terminals are reversibly connected across a source of voltage 145 of which also the mid-point is grounded. Switches 4 and 5 of the orientation switch control the polarity of the voltage across potentiometer 27. Brush 26, carried on but insulated from shaft 25, is rotated by motor P to derive a voltage opposing that on conductor 98 or 99. For example, on orientation "north" conductor 98 is connected to resistor 115, and a motion east of the body observed corresponds to a negative voltage input. Motions east or north are always considered as positive, and the corresponding X and Y voltages received from the computer in the observing means are negative. Brush 26 must therefore move to derive a voltage positive to ground, that is, from the position shown in Fig. 7 toward terminal P2 of potentiometer 27. Switch blades 1 and 2 of the orientation switch are understood to be so connected (on "north") to the modulator amplifier *Pma* that a negative voltage through resistor 115 results in the proper rotation of shaft 25, so that an east component of motion of the body observed appears as a rotation of pulley 28 clockwise as viewed from the right in Fig. 7 and as viewed from above in Fig. 2. Protective resistor 142 is inserted in series between brush 26 and resistor 121.

The circuit of Fig. 8 is like that of Fig. 7 except for the biasing voltage which places arm 20 initially at the left of the board. This voltage, on orientation "north", is a positive voltage from battery 155, through resistor 156 and resistor 157 in the input network *Qn*. The conductors connected to the blades of switches 6 and 7 are initially so arranged that a positive voltage through resistor 157 shall drive motor Q to turn shaft 35, with pulley 38 and brush 36 on potentiometer 37, counter-clockwise as viewed from the right in Fig. 8 and from in front of Fig. 2. This places arm 20 at the left of the board and a negative voltage on conductor 99 (northward motion of the observed body) overcomes in part the bias voltage and moves arm 20 to the right. In all other respects the circuit of Fig. 8 duplicates that of Fig. 7.

From the description thus far given, it will be clear that voltages X and Y, representing the east-west and north-south coordinates of the observed body relative to the point of observation, may be applied to the inputs of amplifiers *Pa*, *Qa*, to draw the horizontal projection (XY, Fig. 2) of the body's path in space whether on the level or on any trajectory. The map may be swung about the observer's map location so that the general direction from the observing point Ra shall always be from left to right on plotting surface 17, and the field of search most efficiently exposed. In an actual embodiment of the invention, the useful observations could begin at a slant range of 15,000 yards for a body approaching the observer or follow a receding body to a like distance. This corresponds, for a map scale 25,000:1, to a plotted distance of 21.6 inches, the useful surface 17 being 30 inches square.

The 75 volts on each half of the potentiometers 27 and 37, for a pen motion of half the plotting surface 17, or 15 inches, means a pen motion of 1 inch per 5 volts on conductor 98 or 99 at the observing means. A 15,000 yard horizontal object distance, or 21.6 inches on surface 17, then requires 108 volts input to amplifier *Pa* or *Qa*, so that the scale to which the D voltage is adjusted must make the X and Y voltages 7.2 volts per 1000 yards. This adjustment is made by selecting on the map a location at a known distance and in a known direction from the observing location; setting the observing means to elevation zero, to the azimuth of the known direction to the selected map location and to the range equaling the known distance and adjusting taps 82 and 84 of Fig. 4 until the pen accurately moves to stand over the selected location.

To draw the H projection (Fig. 2), it is necessary to combine the −H voltage on conductor 93 (Fig. 4) with a voltage representing the ground path of the body observed (the XY plot), starting from a point near the observer at the lower right-hand corner of surface 17 and proceeding as a trace representing the vertical motion of the observed body toward the other side of the board, without regard to the actual showing of the XY plot. This amounts to an observation of the trajectory of the mortar shell, if such is being observed, at right angles to the plane of the shell's motion, as if the shell were always traveling in general direction toward the right as viewed from the right edge of the plotting board.

Figure 12:
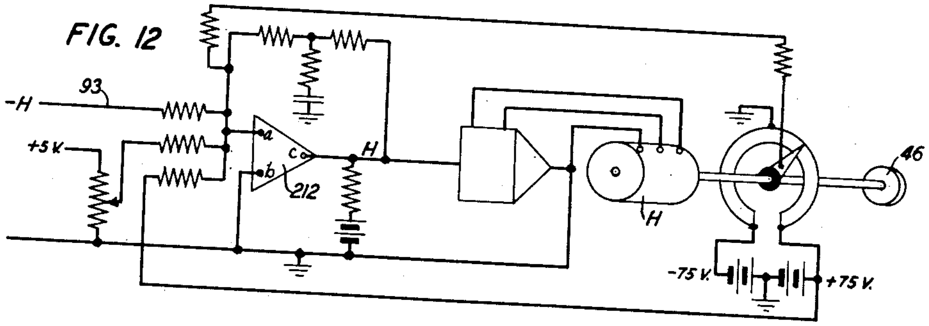
Fig. 12 is a diagram of the apparatus controlling the H motor of Fig. 2.

The H motor is controlled by the −H voltage on conductor 93 by the circuit of Fig. 12, identically like that of Fig. 8 controlling the Q motor except that now there is no need for reversing the direction of rotation of the H motor shaft with change in board orientation, and no need for reversing the polarity of the potentiometer from which a feedback voltage is derived as motor H operates. A bias of +75 volts places arm 21 and pen 23 initially near the mid-point of the right side of the tracing surface, and preliminary connections of the H motor are so made that the negative voltage on conductor 93, representing height of the observed body above the observer's level, shall drive arm 21 toward the left as the operator faces the board from below in Fig. 2.

To draw, always in the same direction on the board, the horizontal motion of the observed body (identical with the XY motion but without regard to course), it is necessary to control the G motor with a voltage −G which is the time integral of the horizontal component of the velocity of the body.

This requires a determination of the horizontal velocities $\dot{X}$ and $\dot{Y}$ $$\left(\frac{dX}{dt} \text{ and } \frac{dY}{dt}\right)$$

and from them of the course of the body as a horizontal angle clockwise from north, and at the same time find the components of these velocities along the course. These components are then summed to give the velocity in the course, which is integrated with respect to time to provide continuously the horizontal coordinate of the H trace, the vertical coordinate being furnished by the H motor.

Figure 9:
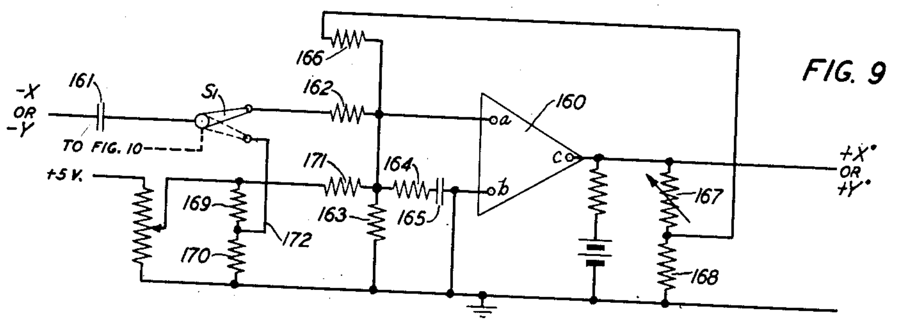
Figs. 9 and 10 are diagrams of circuits for the time differentiation and for the time integration, respectively, of electrical voltages.

Fig. 9 is a simple form of circuit whereby the voltage −X or −Y is differentiated with respect to time to give $\dot{X}$ or $\dot{Y}$. Amplifier 160 is a summing amplifier like other such previously shown. The voltage −X, say, is supplied to point $a$ through condenser 161, 2 microfarads, in series with resistor 162, 0.5 megohm. As is well known, these elements together with feedback resistor 166 (10 megohms) differentiate the voltage −X, the differential voltage being reversed in sign to appear as $\dot{X}$ at point $c$ of amplifier 160.

The input circuit of amplifier 160 includes, besides the parts already mentioned, the usual stabilizing circuit of resistor 164 and condenser 165 in series between point $a$ and ground, feedback resistor 166 (10 megohms) connected between point $a$ and the junction of resistors 167 and 168 in series between point $c$ and ground, as well as the zero set provision. Resistor 167 is initially adjustable between zero and 4,000 ohms, while resistor 168 is 0.1 megohm. The initial adjustment of resistor 167 permits equalization of the gains of the amplifiers used to obtain $\dot{X}$ and $\dot{Y}$. The zero set voltage is shunted here by resistors 169 and 170 in series, of resistance respectively 40,000 and 10,000 ohms, and is supplied over 18 megohm resistor 171 to point $a$. By conductor 172, the junction of resistors 169 and 170 is connected to one contact of single-pole, double-throw switch $S_1$, the other contact of which is connected to resistor 162. As shown in Fig. 9, switch $S_1$ is in the operating position wherein the circuit differentiates the voltage −X or −Y. The alternative dashed position of $S_1$ is used in slewing, permitting condenser 161 to be charged appropriately by the X or Y voltage without risk of overloading amplifier 160 by the rapid rate of voltage change which occurs as the observing means is abruptly moved to track the observed body. The junction of resistors 169 and 170 is at the same voltage as point $a$, but at a low impedance to ground, permitting rapid charging of condenser 161 to the correct voltage. During this operation of the observing means, pens 22 and 23 may be tracing or not as the operator desires; this control is later explained, but motors P and Q move the XY pen to correspond with the observed horizontal position of the body while motor H moves arm 21 to correspond with the observed height thereof. In the alternative or slewing position of switch $S_1$, no differentiation of voltages takes place, no course is determined and no operation of motor G occurs.

For differentiation, condenser 161 and resistor 166 would operate without any smoothing of the varying voltage −X or −Y. The introduction of resistor 162 in series with condenser 161 provides a smoothing circuit, of nominally 1 second settling time, and involving a short time delay which is regained in the integrating circuit of Fig. 10. When tracking of the observed body is satisfactory, switch $S_1$ (and with it switches $S_2$ and $S_3$ of Fig. 10, to which $S_1$ is ganged) is moved to the operating positions shown in Figs. 9 and 10.

Figure 10:
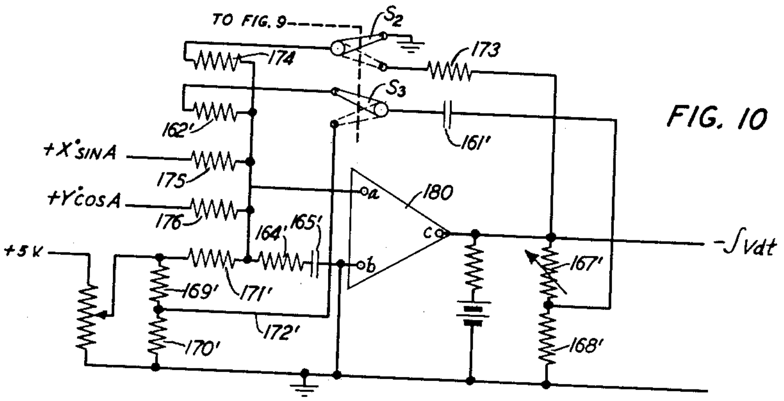

Fig. 10 is a diagram of the circuit which integrates with respect to time the sum of the component velocities $\dot{X}$ sin A and $\dot{Y}$ cos A, where A is the horizontal angle clockwise from north of the direction of forward motion of the observed body. Here condenser 161′ and resistor 162′, having the same values as condenser 161 and resistor 162 of Fig. 9 are in series as a feedback path between points $c$ and $a$ of summing amplifier 180; primed numerals in Fig. 10 identify elements of the same value as are indicated by the like unprimed numerals of Fig. 9. Operating switches $S_2$ and $S_3$, ganged to switch $S_1$ of Fig. 9, downward to the slew position charges condenser 161′ from the zero set circuit as condenser 161, Fig. 9, is charged, and adds the feedback path between points $c$ and $a$ which comprises resistors 173, 50,000 ohms and 174, 40 megohms. When switches $S_2$ and $S_3$ are operated upward to the plotting position, resistor 174 becomes a grid leak from point $a$ to ground, the feedback path just mentioned is disabled and replaced by the integrating feedback path of condenser 161′ and resistor 162′ in series.

Voltages $\dot{X}$ sin A and $\dot{Y}$ cos A, obtained by the apparatus of Fig. 11, pass each to point $a$ over a 10 megohm resistor 175 and 176. These are summed and integrated with respect to time by amplifier 180 and the associated condenser-resistance feedback path between points $c$ and $a$. It may be shown that since the time constant of the feedback path composed of condenser 161′ and resistor 162′ is the same as that of the differentiating input composed of condenser 161 and resistor 162 in Fig. 9, the time delay in differentiation is succeeded by an equal advance in the integration of Fig. 10, so that the integral voltage $-\int Vdt$ at point $c$ of amplifier 180 keeps step with the voltages −X and −Y. Close initial adjustment of the gain of amplifier 180 is provided by variable resistor 167′ in series with fixed resistor 168′, as by the like arrangement in Fig. 9. V is the horizontal velocity of the body, in its path, without regard to direction of motion.

The identity of the time constants above specified is in addition to suitable matching of the scale factors of the circuits of Figs. 9 and 10. These are, for the element values shown, as follows:

$\dot{X}$ in Fig. 9=20.4 volts if X varies at the rate of 1 volt per second; and V in Fig. 10=1 volt per second if $\dot{X}$ sin A is 19.6 volts. Thus if X varies at the rate of .96 volt per second, the resultant V is 1 volt per second. But .96 volt per second in X voltage corresponds to 1 volt per second in the observing means, because of the 10,000 ohm protective resistor. Accordingly, the rate of pen travel on the XY trace is exactly the same as the rate of travel of pen 23 from front to back on surface 17.

The components, parallel and at right angles to the course, of the velocities $\dot{X}$ and $\dot{Y}$ and the course itself are obtained in the circuit shown in Fig. 11. Here voltages −X and −Y on conductors 101, 102, of Fig. 2, are differentiated by differentiating circuits 181 and 182, respectively, as described in connection with Fig. 9. Voltages $\dot{X}$ and $\dot{Y}$ appear on conductors 183 and 184, to be reversed in sign by reversing circuits 185, 186 like those previously described; voltages $-\dot{X}$ and $-\dot{Y}$ appear on conductors 187, 188.

Course motor C, similar to motors P, Q, is controlled from modulator-amplifier 190 as described in connection with Fig. 7. If the horizontal velocities of the observed body are $\dot{X}$ toward the east, $\dot{Y}$ toward the north, and their resultant V makes the angle A clockwise with the Y direction (north) then $\dot{X}$ cos A=$\dot{Y}$ sin A, or $\dot{X}$ cos A−$\dot{Y}$ sin A=0. Motor C drives a shaft 191 carrying, with suitable insulation, potentiometer brushes 192—195 which sweep over sinusoidal potentiometers 196—199, respectively. Initially, in the absence of any voltage input to modulator-amplifier 190 shaft 191 is positioned to place brushes 193 and 194 vertically and in the same sense, while brushes 192 and 195 are horizontal and opposed.

Potentiometers 196—199 are each so wound on a circular card concentric with shaft 191 that the winding has a resistance per turn rising from substantially zero at opposite ends of a diameter of the circle to a maximum at the opposite ends of a diameter at right angles to the diameter of zero resistance per turn; the resistance per turn at any radius between these diameters is proportional to the cosine of the angle between that radius and the diameter connecting the points of maximum resistance per turn. As a result, if the last-named points are grounded and the points on the other diameter are connected, respectively, to positive and negative voltages to ground of the same magnitude, the total resistance between ground and the winding at any radius is proportional to the sine of the angle between ground and that radius, and a brush standing therealong will derive a similar fraction of the voltage between ground and the points of voltage connection, the sign of the derived voltage depending on that of the nearer connection point.

In Fig. 11, conductors 183 and 187 connect respectively the voltages +$\dot{X}$ and −$\dot{X}$ as indicated across the ungrounded diameters of potentiometers 196 and 197; conductors 184 and 188 connect +$\dot{Y}$ and −$\dot{Y}$ similarly across potentiometers 198 and 199. As shaft 191 turns from the initial position through an angle A shown on dial 200 by pointer 205 the voltages $\dot{X}$ cos A and −$\dot{Y}$ sin A, from brushes 193 and 195 respectively, are supplied to summing amplifier 201, the output of which includes potentiometer 202 similar to potentiometer 83 of Fig. 4, where tap 82 has been adjusted to fit the voltage D to the scale factor of the map. Tap 203 in Fig. 11 on potentiometer 202 is ganged to tap 82 in Fig. 4 and where the latter adjustment increased the gain of amplifier 75 the simultaneous adjustment of tap 203 provides on the input of modulator-amplifier 190 a fractional voltage from potentiometer 202, the fraction being the reciprocal of the factor of gain increase of amplifier 75. Thus the voltage controlling motor C is independent of the map scale and the sensitivity of the course-determining system is substantially constant.

It is clear that $\dot{X}$ cos A and $\dot{Y}$ sin A are equal, being the components of $\dot{X}$ and of $\dot{Y}$, respectively, normal to the course of the body observed. Motor C operates in accordance with the net voltage input to modulator-amplifier 190, $\dot{X}$ cos A−$\dot{Y}$ sin A, and shaft 191 comes to rest when this sum is zero, having turned from its initial position through the angle A. Shaft 191 is continued to carry knob 206, which may be manually operated to set shaft 191 approximately on the estimated course and thereby shorten the time taken to determine the angle A.

The components of $\dot{X}$ and of $\dot{Y}$ along the course are added to give the velocity V, the resultant of $\dot{X}$ and $\dot{Y}$. These components, $\dot{X}$ sin A and $\dot{Y}$ cos A, are derived from potentiometers 196, 198, by brushes 192 and 194 and are supplied to the summing and integrating circuit 208, described in connection with Fig. 10. The output voltage of circuit 208 is $-\int Vdt$ as explained, and is hereafter identified as −G. Voltage −G on conductor 210, Fig. 11, and voltage −H on conductor 93, Fig. 4, cooperate to draw the H trace on surface 17; the former controls motor G, Fig. 2, to move pen 23 lengthwise of arm 21, the latter controls motor H to move arm 21 across the board. Voltage −G is proportional numerically to the distance traversed on the ground projection of the trajectory.

Figure 13:
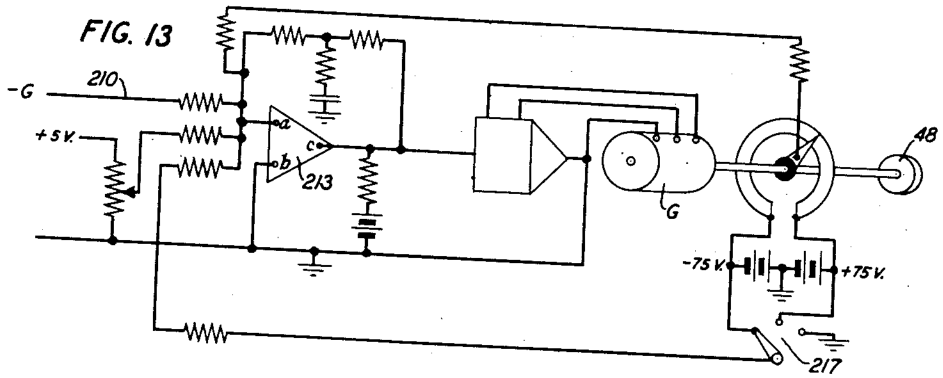
Fig. 13 is a diagram of the apparatus controlling the G motor of Fig. 2.

Figs. 12 and 13, respectively, show the circuits controlling motors H and G. These circuits are similar to those described in connection with Figs. 7 and 8, except that in Fig. 12 an unchanging +75 volts bias is applied to the input of summing amplifier 212 to place arm 21 initially near the right side of the board in order that a negative voltage on conductor 93 shall move arm 21 to the left in accordance with the observed height of the mortar shell above the observer's level, and in Fig. 13 a bias of +75 volts may be applied through switch 217 (later described) to the input of amplifier 213 in order to place pen 23 near the right-hand front corner of the plotting board. This bias applied to pen 23 and switch 217 then turned to the position shown in Fig. 13, where it replaces the positive bias voltage by an equal negative voltage, with no —G voltage on conductor 210 and no —H voltage on conductor 93, pen 23 will draw a straight line parallel to the right edge of the board from front to back; this line is the "ground line" representing the trace of a horizontal plane through the observer's position. It will be understood that motors H and G are, appropriately for the operations described, connected to their respective controlling amplifiers.

The voltages —X, —Y, —G and —H have the same scale factor, this being insured by the choice of equal input resistors through which the X and Y voltages and their components are supplied to the respective summing amplifiers, in accordance with the teaching of Swartzel Patent 2,401,779, previously mentioned. Consequently, distances measured on the ground line agree with distances measured on the XY plot between any two instants of time. To indicate such instants by simultaneous interruptions of the XY and H traces, interrupter 53 of Fig. 2 operates at equal angular intervals as shaft 50 turns, to short the windings of the electromagnets (64, Fig. 3) and allow the permanent magnets (63, Fig. 3) to lift the two pens momentarily from the tracing surface. The extra boss 54', Fig. 2, produces an identifying break of each trace; it may come anywhere on the traces, but at the same moment on both.

Figure 14:
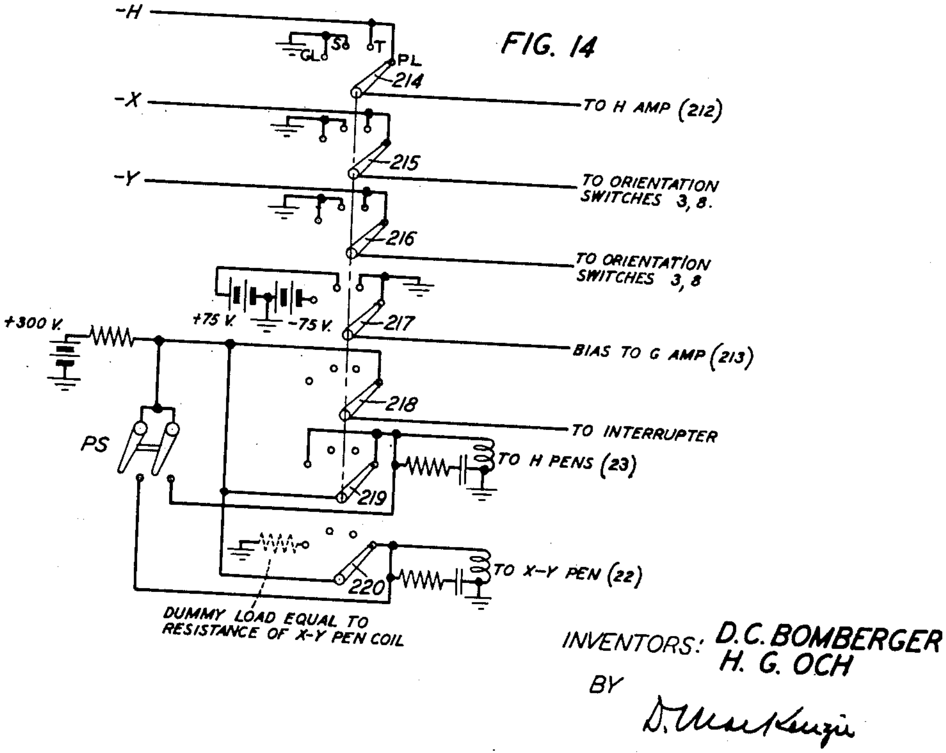
Fig. 14 shows schematically the switching means used in preparing the system of the invention for plotting the desired projections.

Fig. 14 exhibits the relationship of control switches 214—220, ganged together and movable to one or another of the four positions GL, S, T and PL signifying respectively, "ground line," "stand by," "track" and "plot." Before observations begin, the control switches are set on S; this grounds the inputs to amplifiers 212, $Pa$ and $Qa$ at switches 214, 215, 216. Switch 217 applies +75 volts bias to the G amplifier, moving pen 23 to the right front corner of the board. Switch 218 disables the interrupter, and both pens are raised by reason of the positions of switches 219 and 220. Moving switches 214—220 to the GL position, results in no motion of the XY pen since the inputs of amplifiers 212, $Pa$ and $Qa$ remain grounded, but —75 volts replaces +75 volts on the input of amplifier 213. Consequently, the H pen travels to draw the ground line, the pen being on the writing surface by reason of switch 219. This done, switches 214—220 are returned to the S position; both pens are now off the board and the H pen returns to stand above the start of the ground line.

As tracking by the observer begins, the course of the body observed is approximately estimated and knob 206, Fig. 11, is correspondingly set. Slew switches $S_1$, $S_2$ and $S_3$, Figs. 9 and 10 are moved to the slew position and the X and Y voltages on conductors 101 and 102 suitably charge the condensers in the circuits which differentiate X and Y and in the integrating circuit. Moving now the control switches to the track position, T, and moving the slew switches to the operate position, the observer causes the two pens to move over the board without plotting. The course servo of Fig. 11 operates, since now voltages —H, —X and —Y are connected to the inputs of the respective amplifiers and the bias voltage is removed from amplifier 213.

When the motion of the pens indicates that a target is being tracked accurately by the observing means the operator turns the control switches to the PL position. Now interrupter 53 comes into operation, the pens drop to the plotting surface and the XY and H traces of Figs. 1 and 2 begin to be made.

The XY trace indicated in Figs. 1 and 2 corresponds to the motion of a body launched upward from the earth's surface in a direction having a greater or less component toward the observer. The H trace shows the variation in height of the body, but is drawn from front to back on the board regardless of the actual course of the body. If the motion of a surface craft or of an aircraft flying at constant altitude is being observed, the XY trace will show the course of the craft while the H trace will be a straight line parallel to the ground line and distant therefrom by the altitude difference between craft and observer. Obviously, the initial placement of arm 21 can be chosen to allow an H trace of an object at a level below the observer, i. e., a line parallel to the ground line but to the right on surface 17.

The use of the XY and H traces to determine the point of origin of an enemy mortar shell will now be described.

Figure 15B:
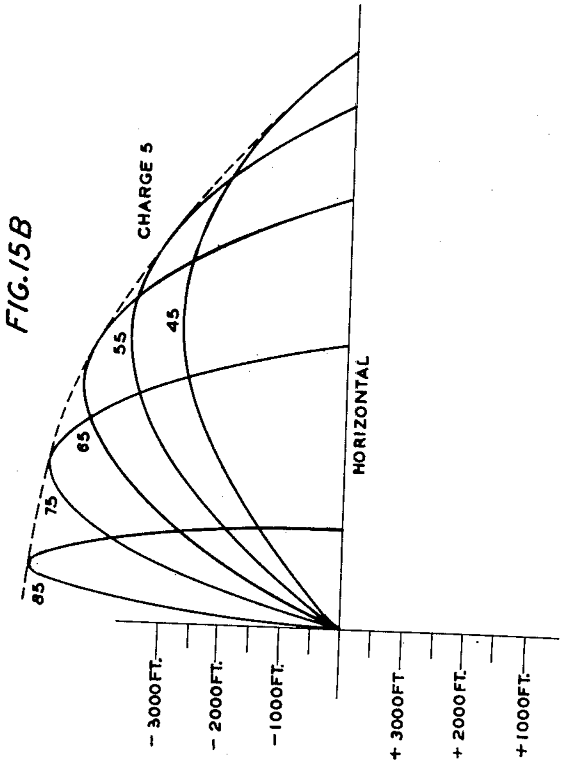
Figs. 15A and 15B are drawings of plotting aids for charges 3 and 4, respectively, used in determining a mortar location from the projections traced on the board of Fig. 1.
Figure 15A:
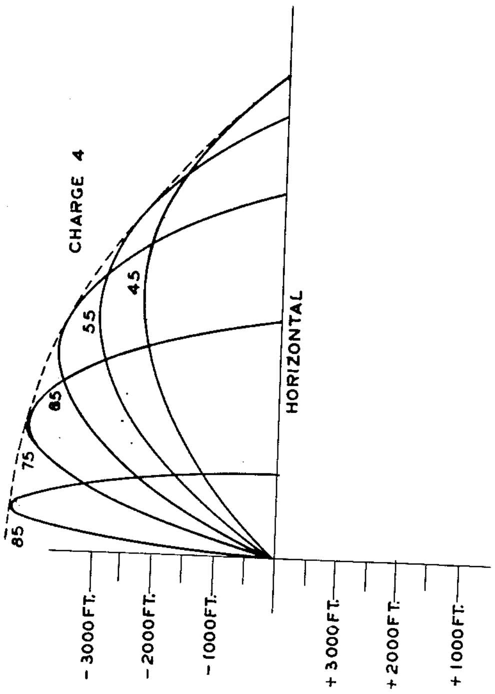

Assuming specimen charges and shells, one plots as in Figs. 15A and 15B, their computed trajectories for firing elevation angles of 45, 55, 65, 75 and 85 degrees. Fig. 15A shows such plots for a charge 4, say; Fig. 15B for a heavier charge 5. These plots are made on transparent material, to scales corresponding to various map scales, with a hole at the mortar location for marking through with a pencil point. If the enemy mortar actually fired the assumed shell with charge 4, at an elevation angle of 65 degrees, the H trace plotted by the system of the invention should coincide with the curve numbered 65 in Fig. 15A. Such a coincidence would naturally be seldom found, and it is usually necessary to interpolate between charges or between elevation angles, or both. Assuming that the rare coincidence exists, one can superpose the transparency plot on the H trace and at once find the point of shell origin with reference to any point on the ground line.

The dashed envelopes in Figs. 15A and 15B are useful in the process of interpolation. This will be explained in two examples of actual traces.

Figure 16B:
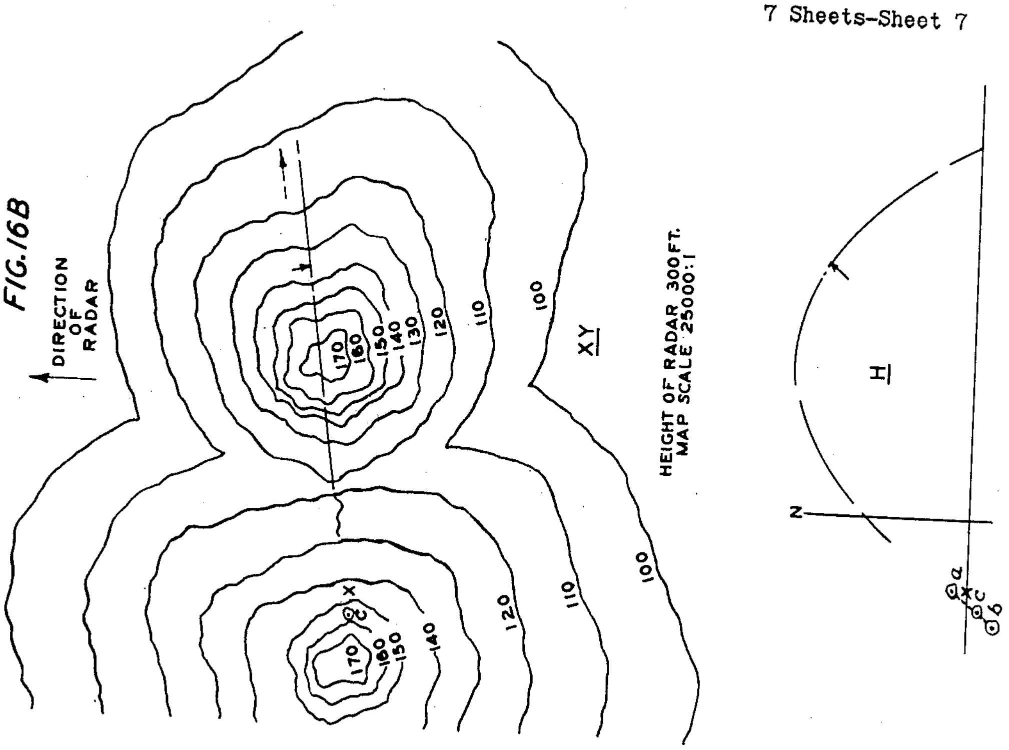
Figs. 16A and 16B show the solutions of specimen problems in mortar location when the mortar is above and below, respectively, the level of the observer.
Figure 16A:
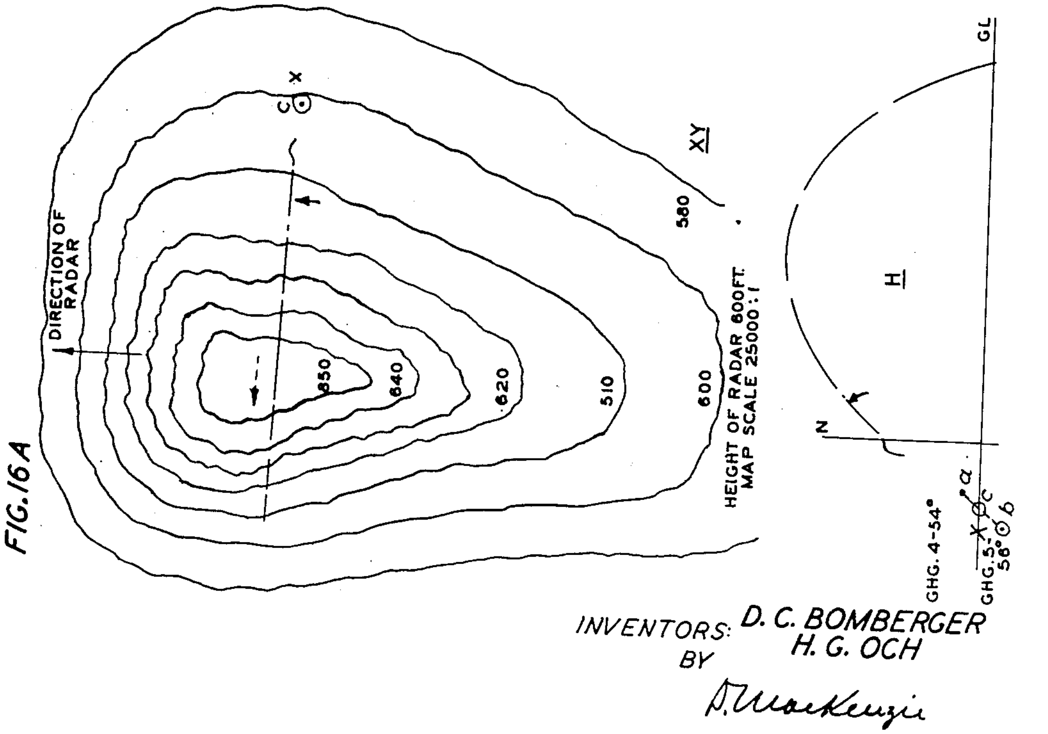

In Figs. 16A and 16B, the XY or horizontal trace, superimposed on contour lines of the map, is shown to the left, the H or vertical trace to the right. In each case the observing post, a radar installation for example, is toward the left, and the lower part of the figure is toward the board operator as in Figs. 5A—5D. On the H trace, the operator draws a line N normal to the ground line GL and passing through the beginning of the first break in the trace after plotting has begun. This break is the first correlation point, made by the interrupter 53, Fig. 2. The extra breaks due to the boss 54', Fig. 2, are indicated by arrows normal to the traces. Dashed arrows on the XY traces indicate the directions of shell movement.

The operator mentally makes a preliminary backward extra-polation of the H trace, finding the approximate intersection X with the ground line GL. This point provides a rough estimate of the distance along the ground line from the mortar location to the first correlation point, projected on the ground line. Since the scales at the XY and H traces are the same, the operator measures this distance behind the first correlation point on the XY trace, in the direction from which the shell is coming. This locates another point *x* on the XY trace. In Fig. 16A this point occurs at an altitude of about 595 feet. Knowing the observer's altitude to be 600 feet above sea level, the operator subtracts this altitude from that of the tentative mortar altitude, to obtain a parallax of −5 feet. Parallax scales, with appropriate algebraic signs, are provided on the transparencies, Figs. 15A and 15B. The parallax is positive if the mortar is above the radar, negative if the mortar is below the radar. In most terrain the tentative location described above will be accurate enough to determine the altitude of the mortar.

The same procedure in Fig. 16B leads to a provisional location near the 150 foot contour line; here the observer's altitude is 300 feet and the parallax is −150 feet.

The observer now selects the transparency which appears to have a suitable size of trajectory for matching the plot. The transparency is laid on the plot so that the ground line GL of the plot coincides with the proper altitude parallax, and with the two ground lines parallel. A match is attempted by sliding the transparency along the ground line. If no match is possible, even by interpolating between the elevation angles provided on the transparency (keeping the plot tangent to the dashed envelope) then the actual charge is larger or smaller than that of the transparency. Interpolation between charges is then required. This is accomplished by moving the transparency vertically on the plot, as well as horizontally. If a match is obtained by raising the transparency higher than the original parallax indicated, the actual charge is greater than the transparency charge. Then the transparency of next higher charge is also required for the interpolation process.

In Fig. 16A, the charge 4 curves of Fig. 15A would be used first. No match is possible with the tentative −5 foot parallax; the transparency is raised, keeping the plot tangent to the envelope, and GL parallel to the ground line of the transparency. At a parallax of +300 feet a good match is obtained with an apparent elevation of 54 degrees. The point *a* is obtained by placing a pencil point in the hole at the mortar location on the transparency.

The transparency for charge 5 (Fig. 15B) is now used; it is moved down, again keeping the plot tangent to the envelope, and ground lines parallel. At a parallax of −400 feet a good match is obtained, with an apparent elevation of 56 degrees. Point *b* is now obtained from this match.

The actual mortar location is on the line joining points *a* and *b*, at the altitude corresponding to the original estimate. This is point *c* in Fig. 16A; the distance, parallel to the ground line GL, between *c* and normal N is stepped off on the horizontal plot, behind the first correlation mark. This provides a point *c* on the horizontal plot which is the actual mortar location.

When the same procedure is used on the plot of Fig. 16B, the estimated parallax of −150 feet permits no match to be obtained with transparencies for charge 4 or 5. However, when the transparency for charge 4 is moved up, keeping the plot tangent to the envelope, a match is found at a parallax of +200 feet, with an apparent elevation of 51 degrees. This produces point *a* of Fig. 16B. Point *b* is obtained with the charge 5 transparency at −400 feet parallax, 53 degrees elevation. Point *c* is on the line joining points *a* and *b* and is at the required 150 feet below the ground line. When the horizontal distance from this point *c* to normal line N is stepped off on the XY trace, point *c* there represents the actual mortar location. It will be observed that in Fig. 16B the actual mortar altitude differs by 5 feet from the tentative altitude at *x*. This small difference would have a negligible effect in determining point *c* on the H trace. It can be shown that this is always true when the mortar fire is at a fairly high angle of elevation, as is usually the case.

A plot of the H trace which is a line parallel to ground line GL corresponds to an object moving horizontally. A line above GL corresponds to an aircraft observed from below, a line below GL to a surface vessel observed from an elevation on shore. In the case of an aircraft, the H trace is important as defining the flight level with reference to the contour lines of the map which the XY trace shows the craft is about to pass over. For a surface vessel the XY trace is enough to enable the observer to warn the vessel of navigation dangers it may be unprepared itself to recognize.

What is claimed is:

1. A system of apparatus for graphically depicting on a plotting surface in horizontal and vertical projection the path of a moving object from continuous observation of the object's position relative to an observing station, said observation providing three voltages continuously proportional respectively to the vertical component and to two mutually perpendicular horizontal components of the varying range of the object from the station, comprising a first plotting means controlled jointly by the horizontal component voltages to trace on the surface a curve representing the horizontal projection of the path, a rotatable shaft, servomotor means for controlling the angle of rotation of the shaft from an initial angular position, means for differentiating with respect to time the horizontal component voltages, means for deriving from each time-differential voltage two fractional voltages proportional respectively to the sine and to the cosine of the angle of rotation of the shaft, means for applying the cosine fractional voltage of one and the sine fractional voltage of the other differential voltage to control the servomotor means to rotate the shaft to the angular position at which the applied fractional voltages are equal, the angle of shaft rotation then indicating the horizontal course of the object, means for summing the consequent sine fractional voltage of one and the consequent cosine fractional voltage of the other differential voltage to derive a voltage proportional to the horizontal velocity of the object, means for integrating with respect to time the last derived voltage and a second plotting means controlled jointly by the integrated voltage and the vertical component voltage to trace on the surface a curve representing the vertical projection of the path of the object, thereby exhibiting the path as resolved into its projections on two mutually perpendicular planes.

2. A system of apparatus for drawing on a plotting surface a curve representing the vertical projection of the path of a moving object of which the range from an observing station is continuously observed, the observation providing three voltages continuously proportional respectively to the vertical component and to two mutually perpendicular horizontal components of the range, comprising a rotatable shaft, servomotor means for controlling the angle of rotation of the shaft from an initial angular position, means for differentiating with respect to time the horizontal component voltages, means for deriving from each time-differential voltage two fractional voltages proportional respectively to the sine and to the cosine of the angle of rotation of the shaft, means for applying the cosine fractional voltage of the one and the sine fractional voltage of the other differential voltage to control the servomotor means to rotate the shaft to the angular position at which the applied fractional voltages are equal, the angle of shaft rotation then corresponding to the horizontal course of the object, means for summing the consequent sine fractional voltage of the one and the consequent cosine fractional voltage of the other differential voltage to derive a voltage proportional to the horizontal velocity of the object, means for integrating with respect to time the last derived voltage and a plotting means controlled jointly by the integrated voltage and the vertical component voltage to trace on the surface a curve representing the projection of the path of the object on a vertical plane.

3. A system of apparatus for drawing on a plotting surface two curves representing in horizontal and vertical projection respectively the path of a moving object of which the range from an observing station is continuously observed by means providing three voltages continuously proportional respectively to the vertical component and to two mutually perpendicular horizontal components of the range, comprising a first and a second plotting pen carried respectively on a first and a second supporting arm and movable lengthwise therealong, said pens being initially held out of contact with the surface, means for simultaneously releasing the pens to trace on the surface, a first servomotor means controlled by one of the horizontal component voltages to move the first pen over the surface lengthwise of the first arm, a second servomotor means controlled by the other horizontal component voltage to move over the surface the first arm at right angles to its length, means for differentiating with respect to time the horizontal component voltages, a rotatable shaft, a third servomotor means for controlling the angle of rotation of the shaft from an initial angular position, means for deriving from each time-differential voltage two fractional voltages proportional respectively to the sine and to the cosine of the angle of rotation, means for applying the cosine fractional voltage of one and the sine fractional voltage of the other of the differential voltages to control the third servomotor means to rotate the shaft to the angular position at which the applied fractional voltages are equal, the angle of shaft rotation then indicating the horizontal course of the object, means for summing the consequent sine fractional voltage of the one and the cosine fractional voltage of the other differential voltage to derive a voltage proportional to the horizontal velocity of the object, means for integrating with respect to time the last derived voltage, a fourth servomotor means controlled by the integrated voltage to move the second pen over the surface lengthwise of the second arm, a fifth servomotor means controlled by the vertical component voltage to move over the surface the second arm at right angles to its length and means for simultaneously interrupting the traces made by the two pens at discrete time instants.

4. A system of apparatus as in claim 3, including switching means for reversing the direction of travel of the first pen lengthwise of the first arm and that of the first arm itself.

5. A system of apparatus as in claim 3, including switching means for interchanging the horizontal component voltages controlling the first and second servomotor means and simultaneously reversing the direction of travel of the first pen lengthwise of the first arm.

6. A system of apparatus as in claim 3 including switching means for interchanging the horizontal component voltages controlling the first and the second servomotor means and simultaneously therewith reversing the direction of travel of the first arm.

7. A system of apparatus as in claim 3 including switching means for selectively applying the horizontal component voltages to control the first and second servomotor means and the directions of travel of the first arm and of the first pen therealong.

8. In a system of apparatus for depicting the path of a moving object of which the range from an observing station is continuously measured, said system being supplied with a first and a second voltage continuously proportional respectively to the east-west and the north-south horizontal component of the range, means for determining the course of the path comprising means including differentiating means for deriving from the first voltage a third voltage proportional to the east-west velocity of the object and a voltage equal but reversed in sign to the third voltage, means including differentiating means for deriving from the second voltage a fourth voltage proportional to the north-south velocity of the object and a voltage equal but reversed in sign to the fourth voltage, a first and a second sinusoidally wound circular potentiometer each grounded across the diameter of maximum resistance per turn, the first potentiometer being in shunt at the diameter of least resistance per turn between the third voltage and the voltage opposite in sign thereto, the second potentiometer being similarly in shunt between the fourth voltage and the voltage opposite in sign thereto, a motor, a shaft rotated by the motor and aligned concentrically with said potentiometers, a first and a second brush insulated from the shaft and carried thereby to traverse radially the first and the second potentiometer respectively, the brushes being angularly spaced about the shaft 90 degrees apart, whereby the first brush selects from the first potentiometer a first fractional voltage proportional to the east-west velocity times the cosine of the angle between the brush radius and the radius of connection of the third voltage while the second brush selects from the second potentiometer a second fractional voltage proportional to the north-south velocity times the negative sine of said angle, summing means for adding the first and second fractional voltages to derive an error voltage proportional to the algebraic sum of the fractional voltages, voltage-responsive means for controlling the motor, means for applying the error voltage to the voltage-responsive means to rotate the shaft to reduce the error voltage substantially to zero, thereby placing the first brush on a radius making with the radius of connection of the third voltage an angle equal to the course of the object east of north, and means for indicating said angle.

9. In a system of apparatus for plotting the path of a moving object continuously observed from an observing station, the observation providing a first and a second voltage proportional respectively to the east-west and the north-south horizontal coordinates of the object relative to the station, means for computing without regard to compass direction the horizontal component of the path comprising means including electrical differentiators for deriving from the provided voltages a third and a fourth voltage proportional respectively to the east-west and the north-south velocity of the object, means for utilizing the third and fourth voltages to determine the course of the object as an angle, means for fractionating the third voltage proportionally to the sine of the angle, means for fractionating the fourth voltage proportionally to the cosine of the angle, means for summing the fractionated voltages and electrical integrating means for integrating with respect to time the summed voltages, thereby deriving a fifth voltage proportional to the horizontal component of the motion of the object.

10. Means as in claim 9 for computing without regard to compass direction the horizontal component of the motion of an observed object, in which the electrical differentiators include each a differentiating and smoothing circuit comprising a condenser and a resistance in series and the electrical integrating means includes an integrating and smoothing circuit comprising a condenser and a resistance in series.

11. Means as in claim 10 wherein the time constants of the differentiating and smoothing circuits are each equal to the time constant of the integrating and smoothing circuit.

12. Means as in claim 11 wherein the equal time constants are of the order of one second.

13. The method of locating on a map of known scale the ground intersection of the trajectory of a moving body continuously observed in range and direction from an observing station which comprises superposing on the map a plotting surface, resolving the observed motion into vertical and horizontal projections thereof, simultaneously plotting on the surface the two projections separately, the horizontal projection to the map scale and the vertical projection with abscissae and ordinates to the like scale, each plot including momentary interruptions identifying corresponding time instants on the two plots, drawing on the surface as the axis of abscissae of the vertical projection a ground line representing the trace of the horizontal plane through the observing station, extrapolating the vertical plot to its estimated intersection with said line estimating the distance on said line between the intersection and a point of the line directly beneath a chosen interruption of the vertical plot and producing the horizontal plot from the corresponding interruption thereof in the direction of the extrapolation through the estimated distance to locate on the surface a point above the map position of the ground intersection.

14. The method of locating on a contour map of known scale the ground intersection of the trajectory of a moving body continuously observed in range and direction from an observing station of known elevation which comprises superposing on the map a plotting surface, resolving the observed motion into vertical and horizontal projections thereof, simultaneously plotting on the surface the two projections separately, the horizontal projection to the map scale and the vertical projection with abscissae and ordinates to the like scale, each plot including momentary interruptions identifying corresponding time instants on the two plots, drawing on the surface as the axis of abscissae of the vertical projection a ground line representing the trace of the horizontal plane through the observing station, extrapolating the vertical plot to its estimated intersection with said line, estimating the distance on said line between the intersection and a point directly beneath a chosen interruption of the vertical plot, producing the horizontal plot from the corresponding interruption thereof in the direction of the extrapolation through the estimated distance, thereby locating on the surface a point above the map position of a provisional fix of the ground intersection, estimating the vertical parallax of the provisional fix relative to the observing station, finding from the extrapolated vertical plot the intersection thereof with a second line parallel to the ground line and vertically removed therefrom by the amount of the parallax, estimating the distance on the second line between the last-named intersection and a point directly beneath the chosen interruption of the vertical plot and producing the horizontal plot from the corresponding interruption in the direction of the extrapolation through the last-named estimated distance to locate on the surface a point above the corrected map position of the ground intersection.

15. The method of locating on a contour map of the earth's surface drawn to a known scale the point of contact with the earth of the trajectory of a moving body of known class continuously observed in range and direction from an observing station of known elevation above sea level which comprises superposing on the map a plotting surface, tracing on the surface a line representing the trace of the horizontal plane through the station, deriving from the observed quantities the vertical and the horizontal projection of a portion of the trajectory, tracing on the surface to the map scale with corresponding interruptions at a plurality of time instants a line representing the horizontal projection and a curve representing the vertical projection referred to the station line, extrapolating the vertical projection trace to its intersection with the station line, estimating the distance on the station line between the intersection and a point beneath a chosen interruption of the vertical projection trace, laying off on the horizontal projection trace beyond the corresponding interruption thereof in the direction of extrapolation the estimated distance to locate provisionally the map position and elevation of the point of contact, providing a plurality of specimen trajectories drawn to the map scale, each referred to a ground line, of bodies of the known class, matching at least two of the specimen trajectories to the vertical projection trace of the observed body to mark on the plotting surface in each case the intersection of the specimen trajectory with the corresponding ground line, joining the intersections so marked by a line, estimating the intersection of the joining line with a line parallel to the station line and removed therefrom by the elevation difference between the station and the provisional point of contact, estimating the distance on the parallel line from the last-named intersection to a point beneath the chosen interruption of the vertical trace and laying off on the horizontal projection trace beyond the corresponding interruption thereof in the direction of extrapolation the last estimated distance to locate the correct map position of the point of contact.

References Cited in the file of this patent

UNITED STATES PATENTS

| Number | Name | Date |
|---|---|---|
| 1,293,747 | Ford | Feb. 11, 1919 |
| 1,829,594 | Hugershoff | Oct. 27 1931 |
| 1,985,266 | Smith et al. | Dec. 25, 1934 |
| 2,395,351 | Sohn | Feb. 19, 1946 |